US007721093B2

(12) United States Patent
Sundararajan

(10) Patent No.: US 7,721,093 B2
(45) Date of Patent: May 18, 2010

(54) AUTHENTICATED EXCHANGE OF PUBLIC INFORMATION USING ELECTRONIC MAIL

(75) Inventor: Narasimhan Sundararajan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 10/816,975

(22) Filed: Apr. 2, 2004

(65) Prior Publication Data

US 2005/0223226 A1 Oct. 6, 2005

(51) Int. Cl.
H04L 9/32 (2006.01)
(52) U.S. Cl. .................................... 713/168; 380/283
(58) Field of Classification Search ................ 713/191, 713/168; 380/277–286, 44–47
See application file for complete search history.

(56) References Cited

U.S. PATENT DOCUMENTS

| 4,405,829 | A | 9/1983 | Rivest et al. | |
|---|---|---|---|---|
| 6,209,093 | B1 | 3/2001 | Venkatesan et al. | |
| 6,351,536 | B1 | 2/2002 | Sasaki | |
| 7,024,690 | B1 * | 4/2006 | Young et al. | 726/5 |
| 7,127,613 | B2 * | 10/2006 | Pabla et al. | 713/171 |
| 2001/0010076 | A1 * | 7/2001 | Wray | 713/151 |
| 2003/0177194 | A1 * | 9/2003 | Crocker et al. | 709/206 |
| 2004/0010684 | A1 | 1/2004 | Douglas | |
| 2004/0034776 | A1 | 2/2004 | Fernando et al. | |

OTHER PUBLICATIONS

Rescorla, Eric. Request for Comments: 2631—Diffie-Hellman Key Agreement Method. Network Working Group. http://www.faqs.org/rfcs/rfc2631.html.*
Dierks et al. The TLS Protocol Version 1.0. Jan. 1999. Network Working Group. RFC 2246. p. 30. http://www.ietf.org/rfc/rfc2246.txt.*
P. Mockapetris, Domain Names—Concepts ad Facilities, IETF Network Working Group RFC 1034, Nov. 1987, 55pp.
D. Crocker, Standard for the Format of ARPA Internet Text Messages, IETF RFC 822, Aug. 1982, 47pp.
T. Dierks et al., The TLS Protocol, Version 1.0, IETF RFC 2246, Jan. 1999, 80pp.
UuidCreate, Microsoft Developer Network, Platform SDK: Remote Procedure Call, accessed from: http://msdn.microsoft.com/library/en-us/rpc/rpc/uuidcreate.asp?frame=true.
Bagwill et al., Security in Open Systems, NIST Special Pub. 800-7, pp. 155-156, Jul. 1994.
Mitchell et al., "Fixing a Problem in the Helsinki Protocol," Operating Systems Review ACM USA, Online!, vol. 32, No. 4, Oct. 1998, pp. 21-24, ACM Press, U.S.A.
Hoffman, "SMTP Service Extension for Secure SMTP Over TLS," Internet Engineering Task Force, Internet Mail Consortium, The Internet Society, Jan. 1999, U.S.A.
Dierks et al., "The TLS Protocol Version 1.0," Internet Engineering Task Force, The Internet Society, Jan. 1999, U.S.A.

* cited by examiner

*Primary Examiner*—Gilberto Barron, Jr.
*Assistant Examiner*—Cordelia Kane
(74) *Attorney, Agent, or Firm*—Senniger Powers LLP

(57) ABSTRACT

Methods and systems are provided for using an existing email transfer protocol, such as SMTP, to exchange digital objects in an authenticated manner. The provided methods and systems solve the bootstrapping problem of computer identities for P2P communication by authenticating the exchange of public information. If the electronic mail protocols are strong, in that sending an email message to a given address results in the message reaching that address with a high degree of confidence, then the exchange of public information performed in accordance with embodiments of the invention is confidently authenticated.

18 Claims, 7 Drawing Sheets

```
                                          400
      Received: from lvmchi-fw1.arfdomainx.com ([10.10.10.17]) by
      chiex01.arfdomainx.loc with Microsoft SMTPSVC(6.0.3790.0);
              Tue, 2 Mar 2004 10:19:35 -0600
      Received: from mail-kan.bigfish.com ([63.161.60.29]) by lvmchi-
      fw1.arfdomainx.com
              via smtpd (for [10.10.10.13]) with SMTP; Tue, 2 Mar 2004
402   10:23:04 -0600
      Received: from mail9-kan.bigfish.com (localhost.localdomain [127.0.0.1])
              by mail9-kan-R.bigfish.com (Postfix) with ESMTP id 87365152296
              for <arf@arfdomainx.com>; Tue, 2 Mar 2004 16:19:12 +0000 (UCT)
      Received: by mail9-kan (MessageSwitch) id 1078244352270381_14927; Tue,
      2 Mar 2004 16:19:12 +0000 (UCT)
      Received: from dotnet-web-development.com (unknown [216.229.129.100])
              by mail9-kan.bigfish.com (Postfix) with ESMTP id 6CD9015277E
              for <arf@arfdomainx.com>; Tue, 2 Mar 2004 16:19:11 +0000 (UCT)
      Received: from [192.168.1.4] (account <john@realaddress.org>)
         by dotnet-web-development.com (CommuniGate Pro WebUser 3.5.9)    406
         with HTTP id 791063 for <arf@arfdomainx.com>; Tue, 02 Mar 2004
404   10:19:11 -0600
      From: "john smith" <john@uchicagox.edu>
      Subject: Test message
      To: arf@arfdomainx.com
410   Date: Tue, 02 Mar 2004 10:19:11 -0600
      Message-ID: <web-791083@dotnet-web-development.com>
      MIME-Version: 1.0
      Content-Type: multipart/mixed; boundary="_===791083====dotnet-web-
      development.com===_"
      X-BigFish: cvs-17(zzfa7R1922H1c4eqf69m16d9j19c2i19c1izzzzz1IQ)
      Return-Path: john@realaddress.org
408   X-OriginalArrivalTime: 02 Mar 2004 16:44:13.0543 (UTC)
      FILETIME=[980DC770:01C40075]

--_===791083====dotnet-web-development.com===_
      Content-Type: text/plain; charset="ISO-8859-1"; format="flowed"
      Content-Transfer-Encoding: quoted-printable --_===791083====dotnet-web-development.com===_
401   Content-Type: application/vnd.ms-excel
      Content-Disposition: attachment;
        filename="excelfile.xls"
      Content-Transfer-Encoding: base64

--_===791083====dotnet-web-development.com===_--

This is the body of the test message.

--
      john smith, ph.d.        john@uchicagox.edu
                                                             405
```

AUTHENTICATED EXCHANGE OF PUBLIC INFORMATION USING ELECTRONIC MAIL

FIELD OF THE INVENTION

This invention pertains generally to the field of information security and more specifically to authentication protocols.

BACKGROUND OF THE INVENTION

A common form of communications between computers connected to the Internet follows a paradigm known in the industry as client-server. For example, existing servers are email servers, web servers, file servers, online banking servers, etc. Clients include home personal computers, office personal computers, laptop computers, hand-held devices, wireless digital telephones, etc. The various client devices connect and interact with the various server devices. In this model the different servers employ their own ways of authenticating and authorizing the client devices that connect with them. For example, some email servers issue and use pre-registered identities to authenticate and authorize. Some banking organizations use their own member identification and password databases to do the authentication and authorization. So a given client device, say a personal computer at home, needs to conform to the differing authentication methods enforced by the different servers with which it connects and interacts. In the client-server model, the broad problem of how two interacting computers "recognize" one another currently is solved by making the server computer enforce its preferences unilaterally on the client computer.

Although the above-described model works well for client-server interaction, it becomes impractical for interactions between the various client machines themselves. The industry terminology for such interaction between various client devices is called peer-to-peer (P2P) communications. In this case, neither client computer can force its authentication preferences on the other. For example, consider the desire for a first user, Alice, to share and exchange videos and pictures from her personal computer with a second user, Bob, who also has a personal computer. Bob may wish to authenticate Alice, in order to be confident that the videos and pictures are indeed being sent by her, rather than being sent by an imposter.

Additionally, Alice may wish to transmit the videos and pictures securely using an encryption technique such as RSA, so that an eavesdropper cannot view the videos or pictures. RSA is a public-key cryptography technique whereby anyone can encrypt data for a given user with the user's public-key, but only the user can decrypt the data by using the corresponding private-key. Thus, Alice and Bob need to first exchange their respective public-keys in order to establish the secure channel per the RSA algorithm. Exchanging public-keys is not a trivial task. Charlie, a malicious hacker, could try to "sit in the middle" of the key exchange communication. Charlie sends his own public-key to Alice, but pretending to be Bob; he sends his own public-key to Bob, but pretending to be Alice. Given that this initial key exchange communication is itself not secure, there is no simple way for Alice and Bob to realize that Charlie is "in the middle". If they fall for Charlie's ploy and start communicating using his key, he can act as the middle-man and pass all the communications between Alice and Bob, but be able to eavesdrop on all the content being passed back and forth. And of course he can make this even worse by changing the passed content as well.

Thus, Alice and Bob have a problem of how they can confidently "bootstrap" the exchange of public keys onto their communications session. More generally, the bootstrapping problem in a P2P setting involves exchanging any sort of public data or digital object such that the recipient is confident it came from the purported sender.

BRIEF SUMMARY OF THE INVENTION

Embodiments of the invention use the popular Simple Mail Transport Protocol (SMTP) for email exchange, to solve the bootstrapping problem of computer identities, for P2P communication. Typically this is a prerequisite for using algorithms like RSA that establish a logically secure communication channel over a physically insecure network. With the RSA algorithm the bootstrapping problem is one of how to have two peer computers exchange their mutual Public Keys without third party mediation (like Certificate Authorities). With other algorithms or technologies, the data involved in such a bootstrapping problem may be different, but the underlying problem of exchanging some public data with the confidence that there is no spoofing is the same.

Embodiments of the invention use existing electronic mail protocols, such as SMTP, to authenticate the exchange of public information. If the electronic mail protocols are strong, in that sending an email message to a given address results in the message reaching that address with a high degree of confidence, then the exchange of public information performed in accordance with embodiments of the invention is authenticated.

In one aspect of the invention, a method is provided for authenticating the sender of a digital object, comprising generating a first unique identifier (UID), transmitting to a previously known address, via an electronic mail protocol, a first message comprising the first UID, receiving, via the electronic mail protocol, a second message comprising a second UID and a copy of the first UID, and transmitting to the previously known address, via the electronic mail protocol, a third message comprising a copy of the second UID, wherein at least one of the messages transmitted to the previously known address further comprises the digital object. In one embodiment of the invention, the digital object is a public key for a cryptographic system. In embodiments of the invention, the electronic mail protocol comprises a mail server operating the Simple Mail Transport Protocol (SMTP).

In another aspect of the invention, a method is provided for authenticating the sender of a digital object, comprising receiving, via an electronic mail protocol, a first message comprising a first unique identifier (UID), generating a second UID, transmitting to a previously known address, via the electronic mail protocol, a second message comprising the second UID and a copy of the first UID, and receiving, via the electronic mail protocol, a third message comprising a copy of the second UID, wherein at least one of the messages received further comprises the digital object. In one embodiment, the digital object is a public key for a cryptographic system. In embodiments of the invention, the electronic mail protocol comprises a mail server operating the Simple Mail Transport Protocol (SMTP).

In another aspect of the invention, a computer-readable medium including computer-executable instructions is provided for facilitating authenticating a sender of a digital object, computer-executable instructions executing the steps of generating a first unique identifier (UID), transmitting to a previously known address, via an electronic mail protocol, a first message comprising the first UID, receiving, via the electronic mail protocol, a second message comprising a second UID and a copy of the first UID, and transmitting to the previously known address, via the electronic mail protocol, a third message comprising a copy of the second UID, wherein at least one of the messages transmitted to the previously known address further comprises the digital object. In embodiments of the invention, the digital object is a public key for a cryptographic system. In embodiments of the invention, the electronic mail protocol comprises a mail server operating the Simple Mail Transport Protocol (SMTP).

The present invention, viewed another way, comprises an apparatus is provided for authenticating the sender of a digital object, comprising a random number generator generating a first unique identifier (UID), a network interface transmitting to a previously known address, via an electronic mail protocol, a first message comprising the first UID, the network interface receiving, via the electronic mail protocol, a second message comprising a second UID and a copy of the first UID, and the network interface transmitting to the previously known address, via the electronic mail protocol, a third message comprising a copy of the second UID, wherein at least one of the messages transmitted to the previously known address further comprises the digital object.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 4 illustrates a sample electronic mail message for use in sending and authenticating, in accordance with an embodiment of the invention;

DETAILED DESCRIPTION OF THE INVENTION

The methods and systems supporting secure key exchanges using email will now be described with respect to a number of embodiments; however, the methods and systems of the invention are not limited to the illustrated embodiments. Moreover, the skilled artisan will readily appreciate that the methods and systems described herein are merely exemplary and that variations can be made without departing from the spirit and scope of the invention.

The invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
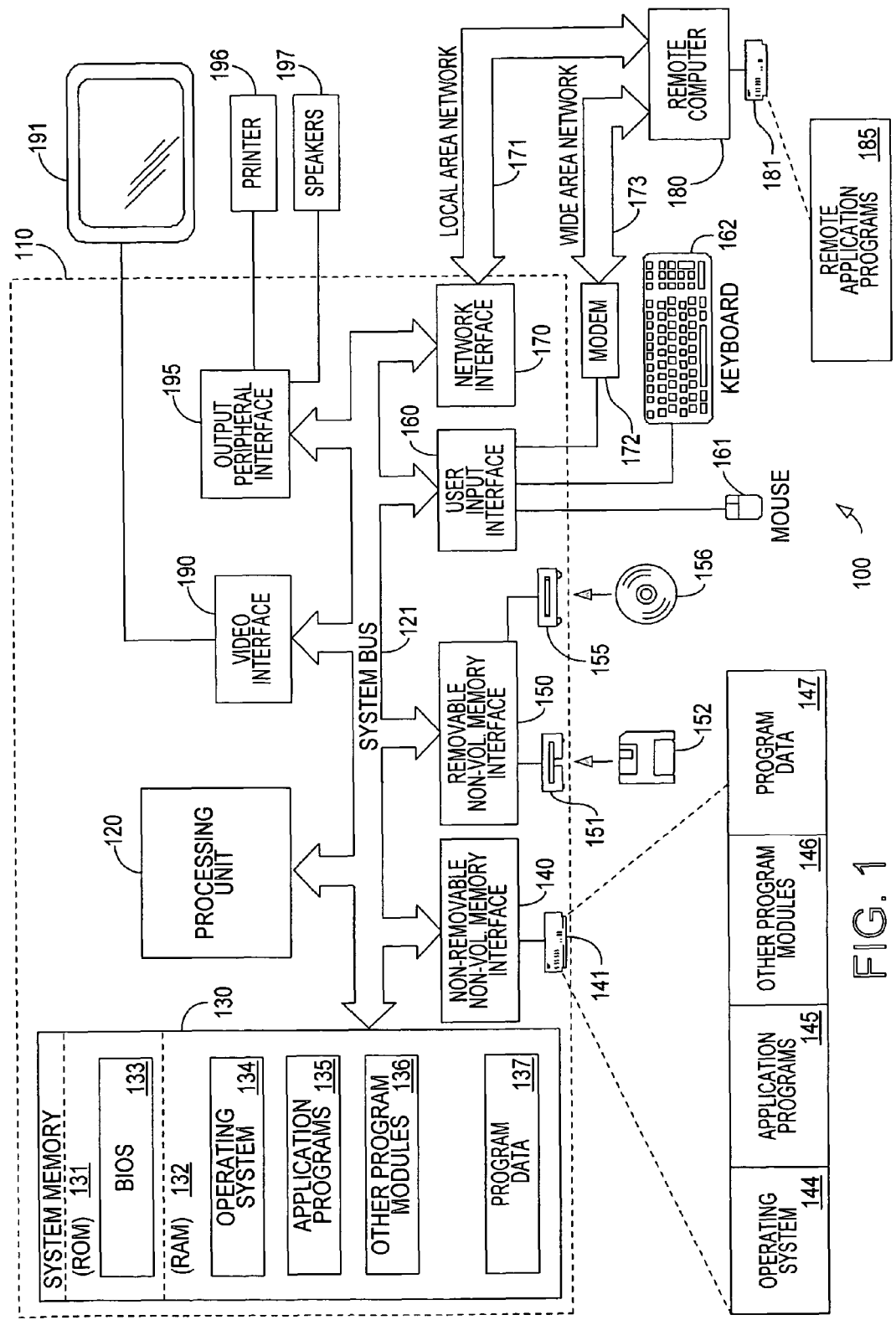
FIG. 1 is a simplified schematic diagram illustrating an exemplary architecture of a computing device for carrying out an authentication protocol, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, SmartCards, SecureDigital cards, SmartMedia cards, CompactFlash cards and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. Alternatively, the computer 110 contains a wireless LAN network interface operating on, for example, the 802.11b protocol, allowing the computer 110 to connect to the LAN 171 without a physical connection. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. Alternatively, the computer 110 contains a wireless WAN network interface operating over, for example, the General Packet Radio Service (GPRS), allowing the computer 110 to connect to the WAN 173 without a physical connection. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Additionally, variations of the computer 110 may be incorporated into other exemplary systems for implementing the invention, such as cellular phones, personal digital assistants, and the like.

Figure 2:
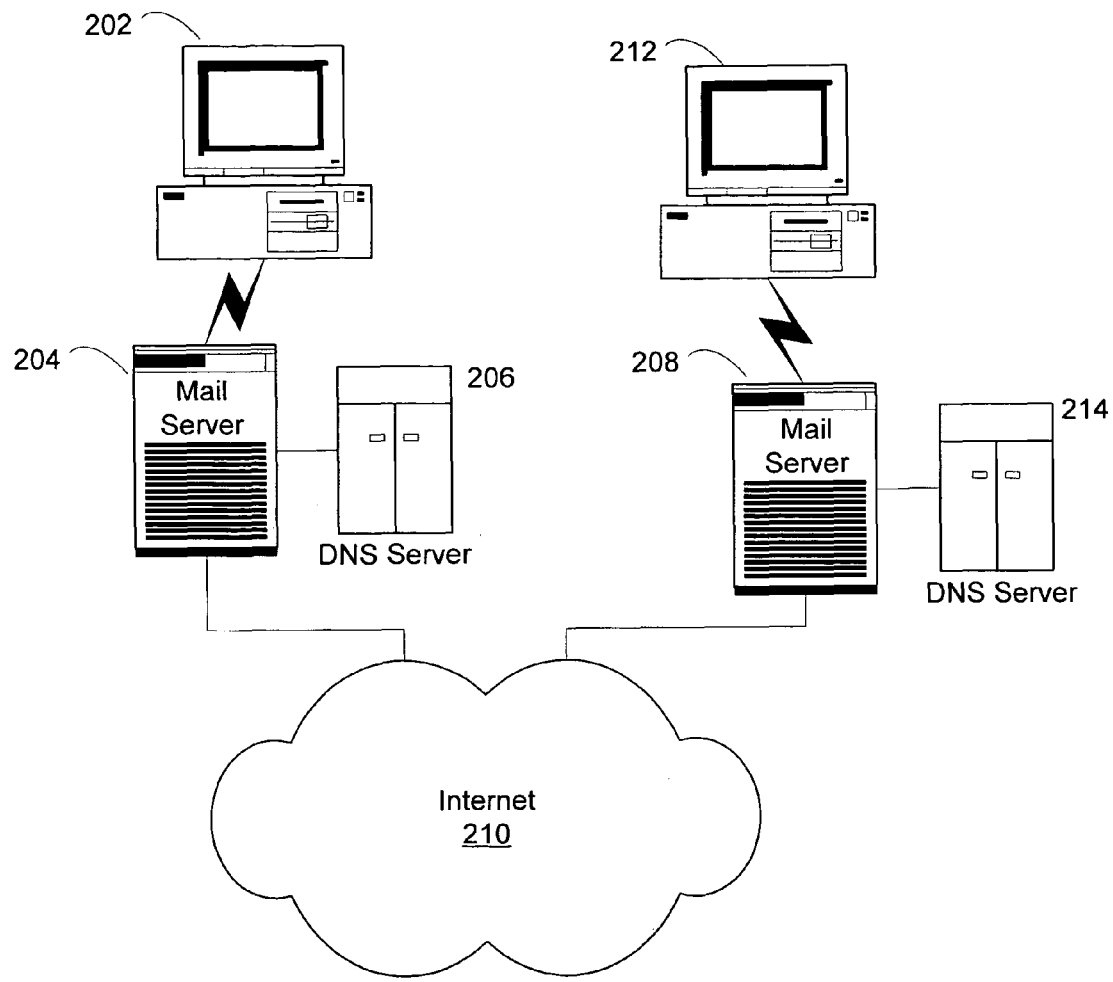
FIG. 2 is an exemplary network communication arrangement for authenticating the sender of a digital object, in accordance with an embodiment of the invention.

The invention is potentially incorporated into computing devices/machines used in a variety of networking environments. Turning to FIG. 2, a simple example of a networking environment is depicted wherein the invention can be exploited. A first computer 202, used by a user "A" who wishes to transmit his public encryption key to user "B" via email, communicates with a mail server 204. The computer 202 contains, for example, a mail application with which user "A" composes messages and transmits them to the mail server 204. The mail server 204 uses a known and accepted mail protocol, such as the Simple Mail Transport Protocol (SMTP) to transmit electronic messages. A message created by user "A" typically contains an address for a recipient in the form of "userB@domain.com". The characters to the right of the '@' symbol, "domain.com" in this example, comprise the domain name, which is a logical domain for a computer receiving mail for user "B". The mail server 204 obtains a corresponding physical address for the logical address by querying a Domain Name System (DNS) server 206. The DNS server 206 belongs to a hierarchy of distributed DNS servers, which serves as mapping service between logical addresses and physical addresses. The physical address takes the form of an Internet Protocol (IP) address, which identifies a computer 208 on the Internet 210. Embodiments of the invention establish a secure communications channel between the sending mail server 204 and the receiving mail server 212 by using Transport Layer Security (TLS), ensuring that communications between the two servers cannot be eavesdropped. The mail server 204 sends the email message with the obtained physical address using the TCP/IP protocol, causing it to be routed over the Internet 210. The message reaches a computer 208 associated with the IP address that acts as a mail server for user "B". User "B", the intended recipient of the message, uses a computer 212 to obtain email messages intended for him. Computer 212 communicates with mail server 208 and receives the appropriate messages. Similarly, when user "B" attempts to send an email message over the Internet 210, the mail server 208 queries a DNS server 214 to obtain the physical address of the intended recipient.

Figure 3:
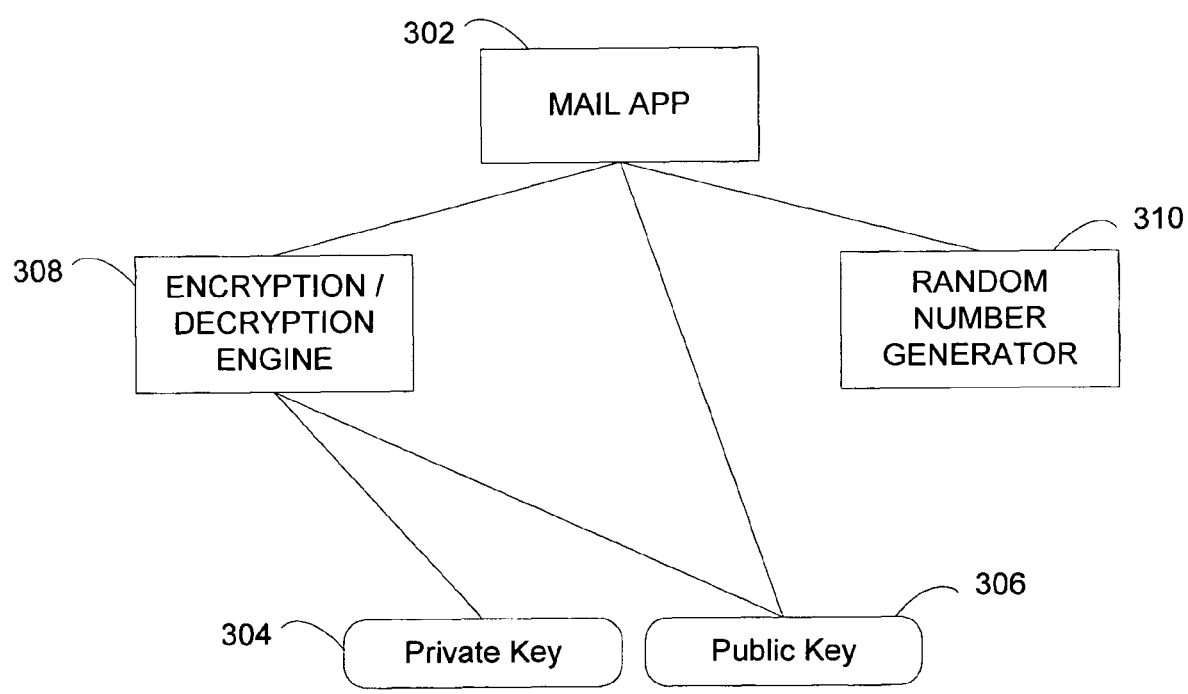
FIG. 3 illustrates an exemplary component architectures for use in authentication, in accordance with an embodiment of the invention.

FIG. 3 illustrates a set of software components executing on the user computer 202 in accordance with an embodiment of the invention. The user interacts with a mail application program 302 to send and receive email messages. An exemplary mail application program is Outlook, by the MICROSOFT CORPORATION of Redmond, Wash. The mail application 302 sends and receives both text and binary files, such as executable programs, documents or other files. A single message sent or received by the mail application 302 can contain text, binary files, or both. Embodiments of the invention facilitate the exchange of public cryptographic keys, such as those used in the RSA cryptographic scheme. In such a scheme, a user mathematically creates two keys: a private key 304 and a public key 306. The user makes the public key 306 available to anyone, while he keeps the private key 304 a secret. Although anyone can encrypt a message using the public key 306, only a holder of the private key 304 is able to decrypt the encrypted message. The mathematical properties of the scheme also allow the user to digitally 'sign' messages by encrypting them with his private key 304. Anyone holding the public key 306 can decrypt the message to verify it was written by the user. The exemplary RSA scheme is more fully described in U.S. Pat. No. 4,405,829, which is hereby incorporated in its entirety by reference. The user computer 202, in an embodiment of the invention, contains an encryption/decryption engine 308 for manipulating encrypting and decrypting operations involving the private key 304 and public key 306.

Embodiments of the invention also contain a random number generator 310. The random number generator 310 preferably produces a string of bits such that it is practically infeasible to predict any bit of the sequence given any other bits of the sequence. Thus, it is not necessary that the sequence is truly random, but the sequence must appear random to a sufficient degree of unpredictability. Embodiments call functions such as the UuidCreate function provided by the Microsoft Developer Network, which use pseudo-random number generators employing algorithms to generate a globally unique identifier.

FIG. 4 shows a typical email message 400 with headers, as used in an embodiment of the invention. In embodiments of the invention, the format of an email message complies with RFC 822. In the example message 400, a sender claiming to have the address "john@uchicagox.edu" is sending a message containing a Microsoft Excel file 401 to a recipient at the address "arf@arfdomainx.com". Other attachments, such as public-keys for cryptographic protocols, are alternatively attached. Several headers 402 at the top of the message contain routing information tracing the route of the message 400 from the sender to the recipient. The sender has indicated in a "From" header 404 that his name is "John Smith" and his address is "john@uchicagox.edu". The sender also affirms this is his address in the signature field 405 in the body of the message. However, other headers, such as the "Received" header 406 and the "Return-Path" header 408 indicate the message is actually sent from a different address, "john@realaddress.org". In fact, the headers indicating the sender's address can be faked, or "spoofed" with varying degrees of difficulty. With some messages, a savvy sender can spoof the return addresses to make it impossible to determine with certainty the sender's actual address. In other words, the recipient of a message does not always have confidence that the message actually came from the purported sender.

The message 400 also contains a "To" header 410. The "To" header 410 indicates where the message should be sent, in this case to "arf@arfdomainx.com". Unlike the "From" headers 404, 405, 406 and 408, the "To" header is difficult to spoof. That is, if a sender sends a message to a recipient addressed in the "To" field, there is a high degree of confidence that the message will reach the recipient, and not be redirected somewhere else instead.

Figure 5:
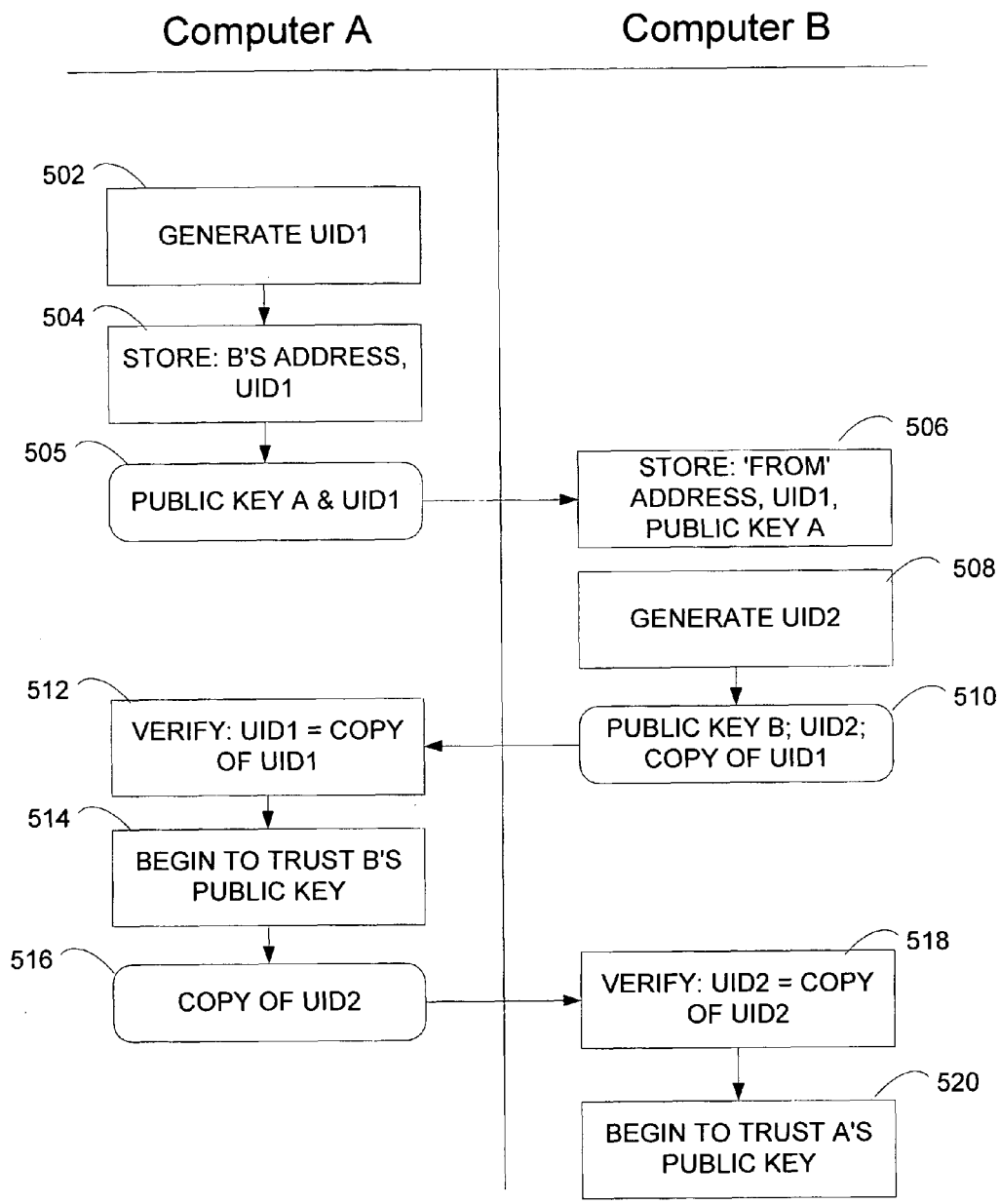
FIG. 5 depicts a flow diagram showing a protocol for authenticating the sender of an digital object, in accordance with an embodiment of the invention.

Turning to FIG. 5, a method is described whereby two users, A and B, of networked computers exchange public keys such that each trusts the authenticity of the other, in accordance with an embodiment of the invention. The method assumes that each user of the two computers has prior knowledge of the other user's email address. The first computer, used by user A, generates a unique identifier, UID1, at step 502 using a random or pseudo-random number generator. The unique identifier is sufficiently large that it is difficult to guess. In practice, 128 bits suffice to ensure the identifier is unique. The first computer stores UID1, indexed by the email address for user B, at step 504. The first computer sends UID1, along with user A's public key, to the second computer by using the previously known email address of user B, at step 505.

The second computer receives the message and stores a copy of UID1, user A's public key, and the email address listed in the "From" field of the message, at step 506. The second computer then uses, by way of example, a random or pseudo-random number generator to create a unique identifier, UID2, at step 508. UID2 is preferably at least 128 bits in length. The second computer sends user B's public key, along with UID2 and a copy of UID 1, to the first computer, at step 510. This message, however, is addressed using the previously known address for user A, disregarding any return email address in a "From" or "Reply To" field of the first message.

At step 512, the first computer receives the message from the second computer and verifies that the copy of UID1 is accurate, using the email address in the "From" field to index the locally stored UID1. User A then trusts that the public key received from user B is authentic (i.e., that it actually came from user B) at step 514. The first computer then sends a copy of UID2 back to user B, at step 516.

The second computer receives the message and verifies that the copy of UID2 is accurate, using the email address in the "From" field to index the locally stored UID2, at step 518. User B then trusts that the public key received from user A is authentic (i.e., that it actually came from user A), at step 520.

Figure 6:
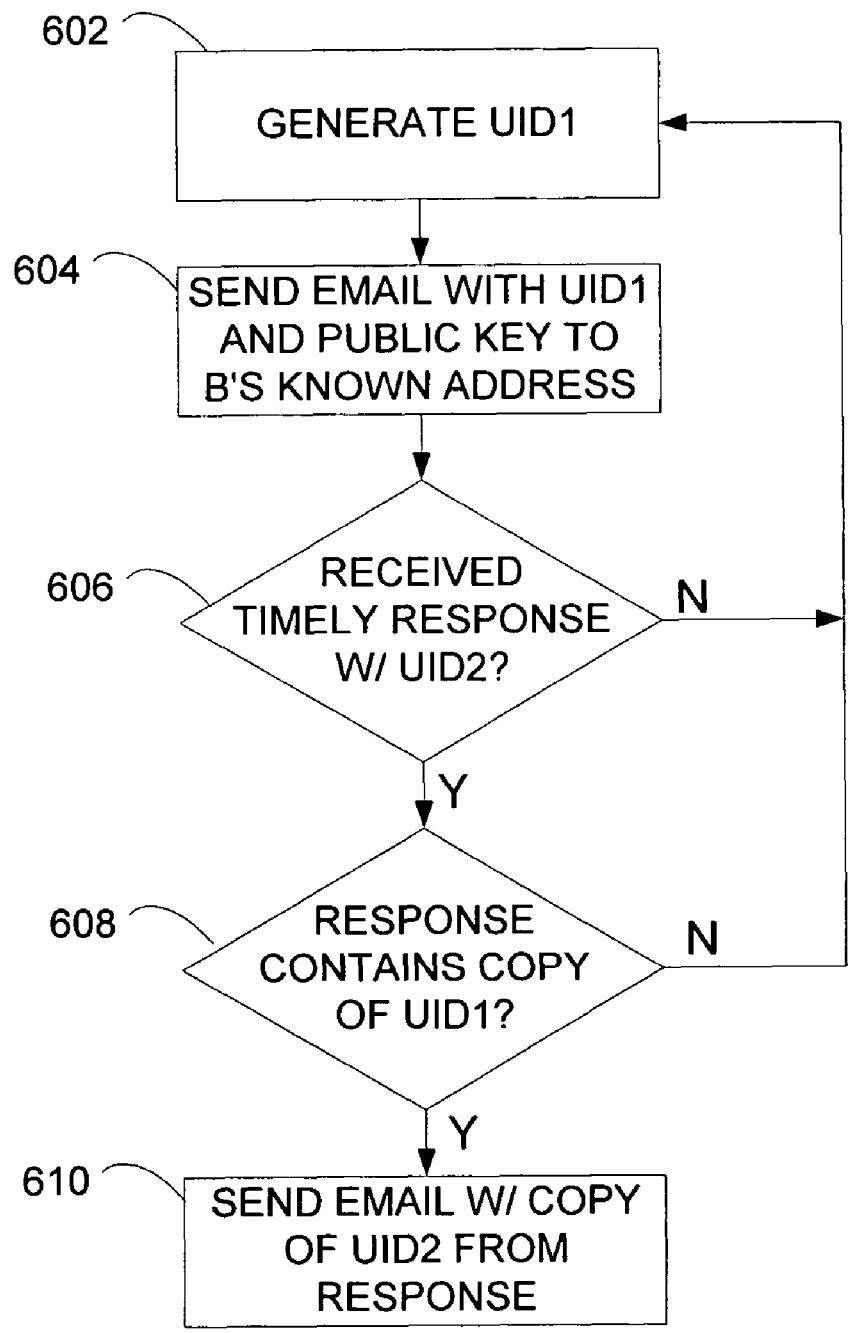
FIG. 6 is a flow diagram illustrating a sender-employed method for use in authenticating a sender of a digital object, according to an embodiment of the invention.

FIG. 6 illustrates a method for using email to send a user's public key such that the recipient has confidence that the public key came from the user, in accordance with an embodiment of the invention. The user first generates a unique identifier (UID1) at step 602 using, by way of example, a random or pseudo-random number generator. The unique identifier is sufficiently large that it is difficult to guess. In practice, 128 bits suffice to ensure the identifier is unique. At step 604, the user sends an email message containing his public key and UID1 to a previously known address for the recipient. The user monitors for a timely response that contains a second unique identifier, UID2, at step 606. In some embodiments, a timespan for monitoring at step 606 is configurable by the user. If a timely response is not received, the user begins again at step 602. Otherwise, the user checks that the response contains a copy of UID1 at step 608. If the copy of UID1 is incorrect, the user begins again at step 602. Otherwise, the user sends an email containing a copy of UID2 to the recipient at step 610.

Figure 7:
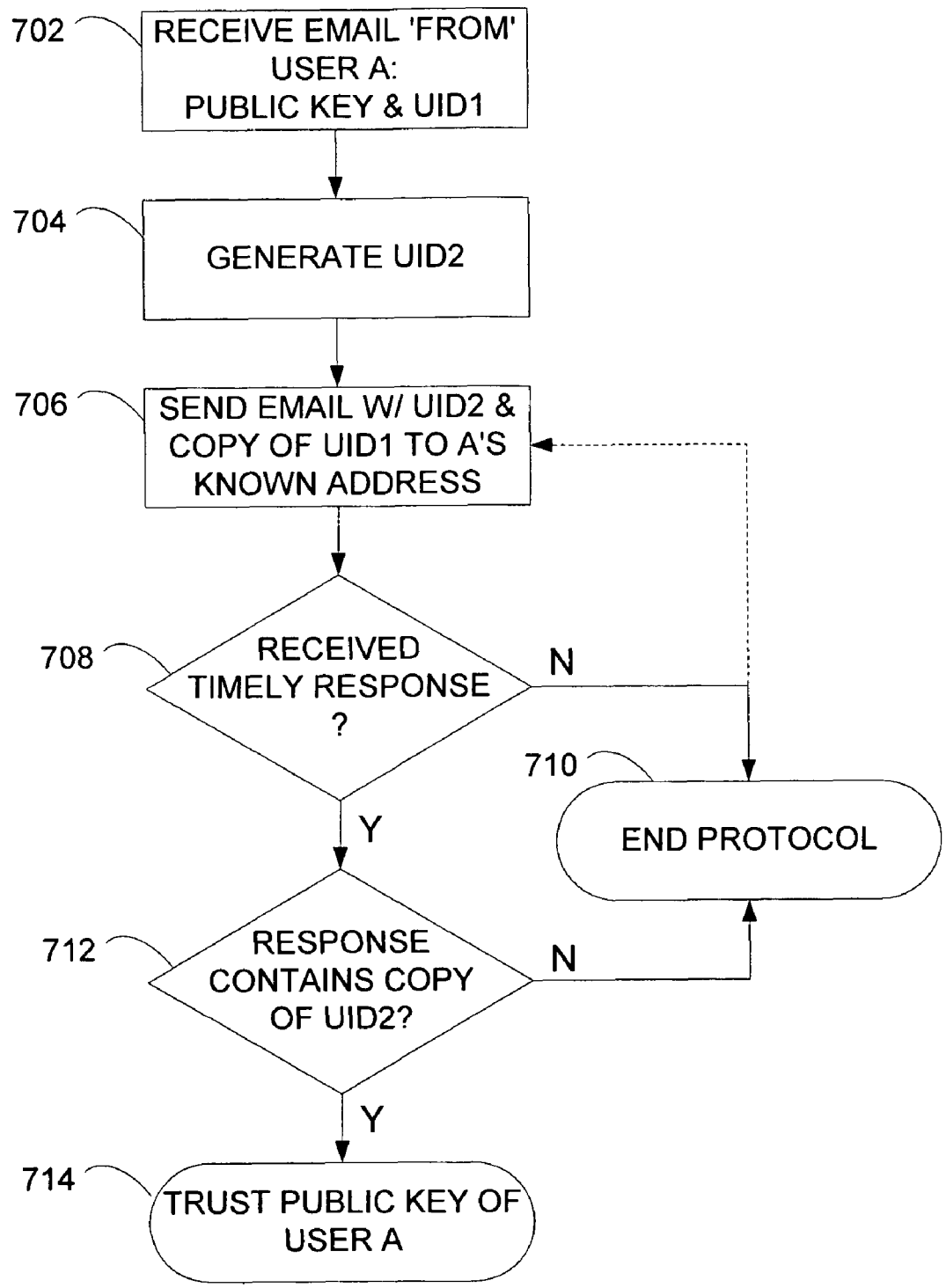
FIG. 7 is a flow diagram illustrating a receiver-employed method for use in authenticating a sender of a digital object, according to an embodiment of the invention.

FIG. 7 illustrates a method for using email to receive a sender's public key such that the user has confidence that the public key came from the sender, in accordance with an embodiment of the invention. The user receives an email at step 702 containing a public key and a unique identifier, UID1. Although the message contains a "From" field identifying a sender, the user is not confident that the message actually came from the purported sender. The user generates a unique identifier UID2 at step 704 using a random or pseudo-random number generator. He sends an email message containing UID2 and a copy of UID1 to the purported sender, but by using a previously known address for the sender, at step 706. The user monitors for a timely response at step 708. In some embodiments, the amount of time used for monitoring at step 708 is configurable by the user. If a timely response is not received, the user ends the protocol at step 710. Alternatively, if a timely response is not received, the user resends the message containing UID2 and a copy of UID1 at step 706. Otherwise, the user checks that the response contains a copy of UID2 at step 712. If the copy of UID2 is incorrect, the protocol ends at step 710. Otherwise, the user is convinced that the public key came from the purported sender, and begins to trust the key at step 714.

Embodiments of the invention further allow the exchange of digital objects other than public keys. For example, a first user can use an embodiment of the invention to send a document to a second user so that the second user is convinced that it was, indeed, the first user who sent the document. More generally, embodiments of the invention enable authentication of parties simultaneously with the transmission of digital objects by "bootstrapping" the objects to email messages. In the instance when the digital object is a public key, the authenticated key can be subsequently used for secure communications between the parties.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A method for authenticating a sender of a digital object on a peer-to-peer (P2P) communication, comprising:

recognizing P2P communication between a first client and a second client, said first client attempting to exchange information securely with said second client via the P2P communication without a third party mediation, said third party mediation including certificate authorities;

in response to the recognized P2P communication, establishing an electronic mail protocol communication between the first client and the second client after the P2P communication is recognized, said e-mail protocol communication being a separate connection from the P2P communication, said e-mail protocol communication being established by Simple Mail Transport Protocol (SMTP);

generating a first unique identifier (UID);

transmitting from the first client to a previously known address of the second client, via the established electronic mail protocol communication, a first electronic mail (e-mail) message comprising the first UID;

receiving from the second client, via the electronic mail protocol communication, a second e-mail message directed to the first client, said second e-mail message comprising a second UID and a copy of the first UID;

verifying the copy of the first UID is identical to the first UID at the first client; and transmitting from the first client to the previously known address of the second client, via the electronic mail protocol communication, a third e-mail message to the second client comprising a copy of the second UID;

wherein at least one of the e-mail messages transmitted to the previously known address between the first client and the second client further comprises the digital object, said digital object authenticating the information to be exchanged between the first client and the second client via the P2P communication and not authenticating the first e-mail message, the second e-mail message, or the third e-mail message.

2. The method of claim 1 wherein the first message further comprises the digital object.

3. The method of claim 1 wherein the third message further comprises the digital object.

4. The method of claim 1 wherein the digital object is a public key for a cryptographic system.

5. The method of claim 4 wherein the second message further comprises a second public key for the cryptographic system.

6. The method of claim 1 wherein the first UID contains at least 128 bits.

7. The method of claim 1, further comprising, at the first client, using the e-mail address from the second client to index the first UID after verifying the copy of the first UID is identical to the first UID at the first client.

8. A method for authenticating a sender of a digital object, comprising:

recognizing a peer-to-peer (P2P) communication between a first client and a second client, said first client attempting to exchange information securely with said second client via the P2P communication without a third party mediation, said third party mediation including certificate authorities;

in response to the recognized P2P communication, establishing an electronic mail protocol communication between the first client and the second client, said e-mail protocol communication being a separate connection from the P2P communication, said e-mail protocol communication being established by Simple Mail Transport Protocol (SMTP);

receiving from the first client, via the established electronic mail protocol communication, a first electronic mail (e-mail) message comprising a first unique identifier (UID);

generating a second UID at the second client;

transmitting from the second client to a previously known address of the first client, via the electronic mail protocol communication, a second e-mail message comprising the second UID and a copy of the first UID;

verifying the copy of the first UID is identical to the first UID at the first client; and receiving at the second client, via the electronic mail protocol communication, a third e-mail message comprising a copy of the second UID from the first client after the first client has verified the copy of the first UID;

wherein at least one of the e-mail messages received further comprises the digital object, said digital object authenticating the information to be exchanged between the first client and the second client via the P2P communication and not authenticating the first e-mail message, the second e-mail message, or the third e-mail message.

9. The method of claim 8 wherein the first message further comprises the digital object.

10. The method of claim 8 wherein the third message further comprises the digital object.

11. The method of claim 8 wherein the digital object is a public key for a cryptographic system.

12. The method of claim 11 wherein the second electronic mail message further comprises a second public key for the cryptographic system.

13. The method of claim 8 wherein the first UID contains at least 128 bits.

14. The method of claim 9, further comprising, at the second client, verifying the copy of the second UID is identical to the second UID at the second client and using the e-mail address from the first client to index the second UID after verifying.

15. A computer storage medium including computer-executable instructions facilitating authenticating a sender of a digital object on a peer-to-peer (P2P) communication, computer-executable instructions executing the steps of:

recognizing a peer-to-peer (P2P) communication between a first client and a second client, said first client attempting to exchange information securely with said second client via the P2P communication without a third party mediation, said third party mediation including certificate authorities;

in response to the recognized P2P communication, establishing an electronic mail protocol communication between the first client and the second client, said e-mail protocol communication being a separate connection from the P2P communication, said e-mail protocol communication being established by Simple Mail Transport Protocol (SMTP);

generating a first unique identifier (UID);

transmitting from the first client to a previously known address of the second client, via the established electronic mail protocol communication, a first electronic mail (e-mail) message comprising the first UID;

receiving from the second client, via the electronic mail protocol communication, a second e-mail message directed to the first client comprising a second UID and a copy of the first UID;

verifying the copy of the first UID is identical to the first UID at the first client; and transmitting from the first client to the previously known address, via the electronic mail protocol communication, a third e-mail message to the second client comprising a copy of the second UID;

wherein at least one of the messages transmitted to the previously known address further comprises the digital object, said digital object including the information to be exchanged between the first client and the second client via the P2P communication and not authenticating the first e-mail message, the second e-mail message, or the third e-mail message.

16. The computer storage medium of claim 15 wherein the digital object is a public key for a cryptographic system.

17. The computer storage medium of claim 16 wherein the second message further comprises a second public key for the cryptographic system.

18. An apparatus for securely exchanging a public key without third party mediation, comprising:

a random number generator generating a first unique identifier (UID);

a network interface recognizing a peer-to-peer (P2P) communication between a first client and a second client, said first client attempting to exchange a public key securely with said second client via the P2P communication;

wherein, in response to the recognized P2P communication, the network interface establishes an electronic mail protocol communication between the first client and the second client, said e-mail protocol communication being a separate connection from the P2P communication, said e-mail protocol communication being established by Simple Mail Transport Protocol (SMTP);

wherein the network interface transmits to a previously known address associated with the second client, via the established electronic mail (e-mail) protocol communication, a first e-mail message comprising the first UID;

wherein the network interface receives, via the electronic mail protocol communication, a second e-mail message transmitted to a previously known address associated with the first client, said second e-mail message comprising a second UID and a copy of the first UID, wherein the copy of the first UID is compared to the first UID for verification thereof wherein the network interface transmits to the previously known address associated with the second client, via the electronic mail protocol communication, a third e-mail message comprising a copy of the second UID, wherein the copy of the second UID is compared to the second UID for verification thereof; and wherein at least one of the e-mail messages transmitted to the previously known address associated with the second client further comprises the key by which the information to be exchanged between the first client and the second client via the P2P communication is secured and not authenticating the first e-mail message, the second e-mail message, or the third e-mail message.

* * * * *